(12) United States Patent
Wu

(10) Patent No.: US 10,559,171 B2
(45) Date of Patent: *Feb. 11, 2020

(54) ELECTRONIC SYSTEM SHARING POWER WITH DOORBELL AND POWER-SUPPLY METHOD THEREOF

(71) Applicant: Chicony Electronics Co., Ltd., New Taipei (TW)

(72) Inventor: Jui-Ching Wu, New Taipei (TW)

(73) Assignee: CHICONY ELECTRONICS CO., LTD., New Taipei (TW)

(*) Notice: Subject to any disclaimer, the term of this patent is extended or adjusted under 35 U.S.C. 154(b) by 358 days.

This patent is subject to a terminal disclaimer.

(21) Appl. No.: 15/610,856

(22) Filed: Jun. 1, 2017

(65) Prior Publication Data

US 2018/0190083 A1 Jul. 5, 2018

(30) Foreign Application Priority Data

Dec. 30, 2016 (TW) .............................. 105144305 A

(51) Int. Cl.
*G08B 3/10* (2006.01)
*H02M 1/00* (2006.01)

(52) U.S. Cl.
CPC ....... *G08B 3/10* (2013.01); *H02M 2001/0006* (2013.01)

(58) Field of Classification Search
CPC .............. G08B 3/10; G08B 7/062; H02J 9/08
USPC ......................................................... 340/333
See application file for complete search history.

(56) References Cited

U.S. PATENT DOCUMENTS

| | | | | |
|---|---|---|---|---|
| 5,748,074 A | * | 5/1998 | Chomet .................. | G08B 3/10 340/328 |
| 2011/0090068 A1 | * | 4/2011 | Langer .................... | G08B 3/10 340/333 |
| 2017/0061747 A1 | * | 3/2017 | Christianson .......... | G08B 25/10 |

* cited by examiner

*Primary Examiner* — Qutbuddin Ghulamali
(74) *Attorney, Agent, or Firm* — Muncy, Geissler, Olds & Lowe, P.C.

(57) ABSTRACT

An electronic system sharing power with doorbell includes two power contacts, an AC switch, a first AC/DC conversion circuit, a DC switch, an electronic device, and a doorbell-driving device. The first AC/DC conversion circuit receives an AC power via the power contacts and generates a DC power according to the AC power. In a normal state, the AC switch is off and the DC switch is on. Therefore, the electronic device is powered by the DC power. When the electronic device receives an enabling signal, the electronic device controls the AC switch to be on, to cause the voltage of the doorbell contacts to change from a low voltage to a high voltage. The doorbell-driving device detects the voltage of the doorbell contacts and supplies the power to a doorbell according to the detected voltage.

15 Claims, 6 Drawing Sheets

ELECTRONIC SYSTEM SHARING POWER WITH DOORBELL AND POWER-SUPPLY METHOD THEREOF

CROSS-REFERENCE TO RELATED APPLICATION

This non-provisional application claims priority under 35 U.S.C. § 119(a) to Patent Application No. 105144305 filed in Taiwan, R.O.C. on Dec. 30, 2016, the entire contents of which are hereby incorporated by reference.

BACKGROUND

Technical Field

The instant disclosure relates to a design regarding a circuit for sharing power with a doorbell, in particular, to an electronic system sharing power with doorbell and a power-supply method thereof.

Related Art

Commonly, buildings have doorbell devices for visitors to notify the people in the buildings to open the doors in a simple manner. The doorbell device includes a doorbell for making sounds and a switch for driving the doorbell to make sounds. The doorbell is installed inside the residence, and the switch of the doorbell is installed o on the door of the building. Therefore, visitors can press the switch to drive the doorbell inside the residence to make sounds. Accordingly, because the doorbell device is an essential element in the building, wires for doorbell device are preserved in the building, so that the doorbell and the switch can be installed conveniently. Even if the doorbell devices are developed and improved to have different types like musical doorbells, electronic doorbells, or the like, the assembling of the doorbells are the same.

In the construction of a building, two installation box holes are respectively disposed on proper positions of an outdoor wall and an indoor wall, and wires are disposed inside the walls to communicate with the two installation box holes and the indoor power (i.e., alternate current (AC) power). Therefore, doorbell contacts and switch contacts are formed in the two installation box holes, respectively. Accordingly, a user can connect the doorbell to the doorbell contacts and connect the switch to the switch contacts, and fastening the doorbell and the switch in the indoor and outdoor installation box holes, respectively, to complete the assembling of the doorbell device in a simple and convenient manner.

Besides installed with the doorbells, for protecting the security and safety, buildings of general residences, office buildings, or departments are installed with security devices, such as interphones, callers, fire equipment, door lock sensors, monitors, broadcasts, or other electronic devices. As a result, the buildings must be provided with additional wires for supplying power to these added security devices. Consequently, the assembling of the security devices is inconvenient.

SUMMARY

In one embodiment, an electronic system sharing power with doorbell includes two power contacts, an alternate current (AC) switch, a first alternate current/direct current (AC/DC) conversion circuit, a direct current (DC) switch, an electronic device, and a doorbell-driving device. The two power contacts are respectively adapted to be coupled to two switch contacts. The AC switch is coupled between the two power contacts. The first AC/DC conversion circuit and the AC switch are connected in parallel between the two power contacts. One end of the DC switch is coupled to the first AC/DC conversion circuit. The electronic device is coupled to another end of the DC switch, control end of the AC switch, and control end of the DC switch. The doorbell-driving device is adapted to be coupled to two doorbell contacts and a doorbell. One of the two doorbell contacts is coupled to one of the two switch contacts. The first AC/DC conversion circuit receives an AC power via the two power contacts and generates a DC power according to the AC power. The AC switch is normal off, and the DC switch is normally on. The electronic device is powered by the DC power. The electronic device provides a functional operation and controls the AC switch to be on according to an enabling signal. The doorbell-driving device detects a voltage difference of the doorbell contacts and supplies power to the doorbell according to the detected voltage.

In one embodiment, a power-supply method for sharing power with doorbell includes receiving an alternate current (AC) power via two switch contacts, generating a direct current (DC) power according to the AC power, supplying the DC power to an electronic device via a DC switch, generating a control signal according to an enabling signal generated by a doorbell actuator, connecting the two switch contacts to each other in response to the control signal to change the voltage difference between the two doorbell contacts from a low voltage to a high voltage; detecting the voltage difference between the two doorbell contacts, dis-driving a doorbell when the voltage difference is detected to be the low voltage, and driving the doorbell according to the voltage difference when the voltage difference is detected to be the high voltage.

Based on the above, the electronic system sharing power with doorbell and the power-supply method thereof in accordance with the foregoing embodiments can utilize the power of the doorbell to power other electronic devices without affecting the operation of the doorbell. In addition, the electronic system sharing power with doorbell and the power-supply method thereof in accordance with the foregoing embodiments can be installed in the existing installation box hole and the existing doorbell installation box hole on the building in a convenient and simple manner without assembling additional wires on the building.

BRIEF DESCRIPTION OF THE DRAWINGS

The disclosure will become more fully understood from the detailed description given herein below for illustration only, and thus not limitative of the disclosure, wherein.

DETAILED DESCRIPTION

Figure 1:
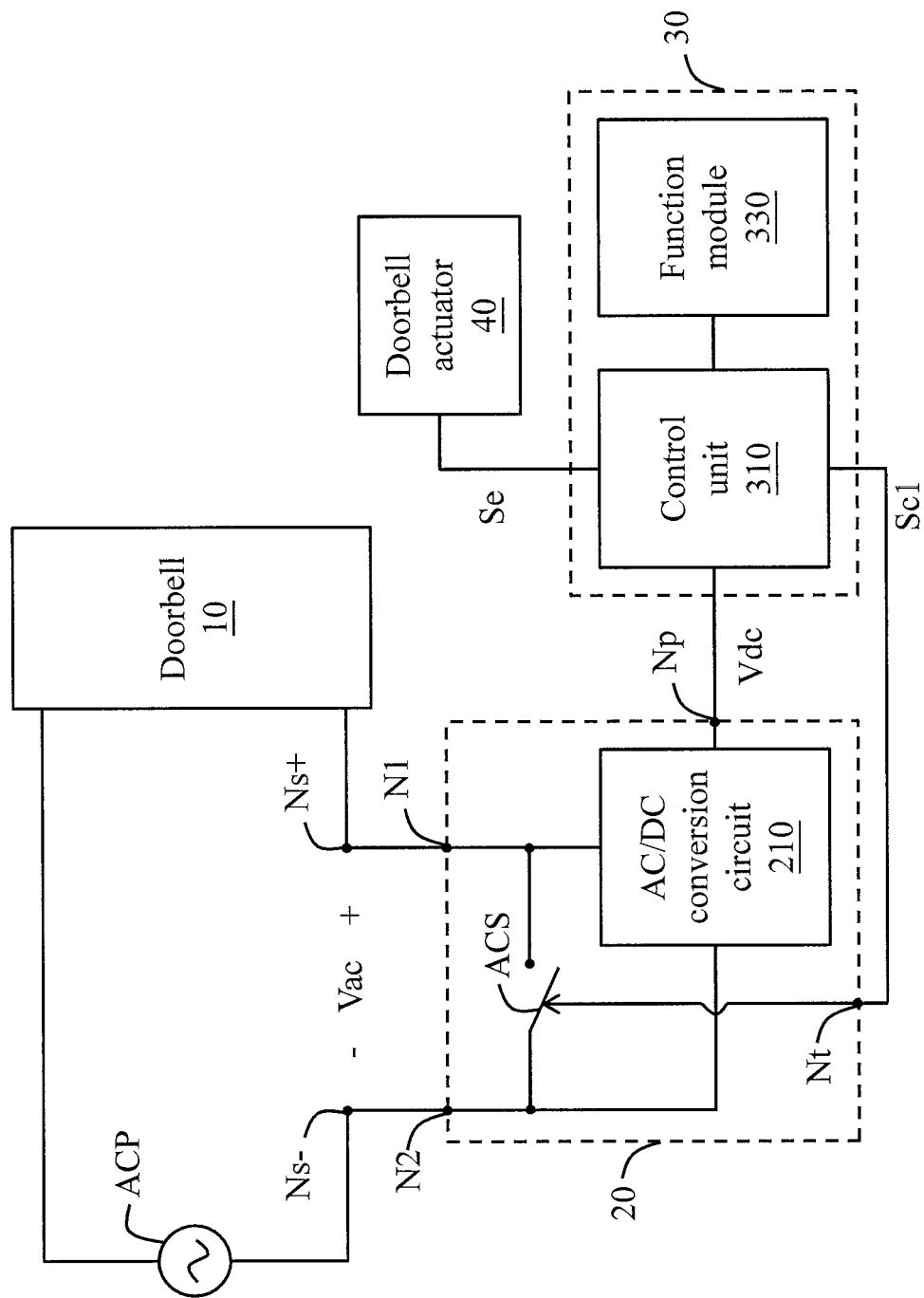
FIG. 1 illustrates a schematic view of an electronic system sharing power with doorbell of a first embodiment of the instant disclosure.

FIG. 1 illustrates a schematic view of an electronic system sharing power with doorbell of a first embodiment of the instant disclosure. Please refer to FIG. 1. The electronic system includes a power-supply device 20, an electronic device 30, and a doorbell actuator 40. The power-supply device 20 includes two power contacts N1, N2, an alternate current (AC) switch ACS, an alternate current/direct current (AC/DC) conversion circuit 210, a power-supply node Np, and a control node Nt. The electronic device 30 includes a control unit 310 and a function module 330. The AC switch ACS is coupled between two power contacts N1, N2, and a control end of the AC switch ACS is coupled to the control unit 310. Two input ends of the AC/DC conversion circuit 210 are respectively coupled to the two power contacts N1, N2. In other words, the AC/DC conversion circuit 210 and the AC switch ACS are connected to each other in parallel. An output end of the AC/DC conversion circuit 210 is coupled to the electronic device 30. The doorbell actuator 40 is coupled to the control unit 310. The control unit 310 is coupled to the function module 330.

In operation, the power contact N1 is directly connected to a switch contact Ns+, and the power contact N2 is directly connected to a switch contact Ns−. In other words, the power-supply device 20 replaces the switch of the conventional doorbell device and is directly connected to the switch contacts Ns+, Ns− reserved on the building. The switch contacts Ns+, Ns− are coupled to the doorbell 10 installed on the building and an AC power source ACP (e.g., indoor power) via wires. Therefore, the power contacts Ns+, Ns− can receive the AC power Vac supplied by the AC power source ACP via the switch contacts Ns+, Ns−. Wherein, the AC power source ACP may be a combination of the main electricity and a transformer (not shown). Here, the main electricity may supply an AC voltage of 110V to 220V. Then, the supplied AC voltage is transformed, by the transformer, into the AC power Vac suitable for the doorbell 10, e.g., an AC voltage of 8V to 24V.

The AC switch ACS is normally off. The AC/DC conversion circuit 210 receives the AC power Vac via the power contacts N1, N2, converts the AC power Vac into a DC power Vdc, and supplies the DC power Vdc to the electronic device 30 (the control unit 310 and the function module 330) as the working power of the electronic device 30.

When the doorbell actuator 40 is enabled (e.g., when the doorbell actuator 40 is pressed, touched, or inputted with certain passwords or when the doorbell actuator 40 recognizes physiological features), the doorbell actuator 40 generates an enabling signal Se to the control unit 310. The control unit 310 generates a control signal Sc1 according to the enabling signal Se, and controls the AC switch ACS to be on with the control signal Sc1. Therefore, the AC power source ACP is directly coupled to the doorbell 10, so as to supply the doorbell 10 with the power for working, and then to cause the doorbell 10 to ring (i.e., to make sounds).

In some embodiments, the function module 330 may include one or more function circuits. The function circuits are adapted to provide different functions. Here, the control unit 310 further controls the operation of the function module 330.

The aforementioned architecture can be properly adapted to an electronic device 30 drawing small electrical current. However, when the architecture is adapted to an electronic device drawing large electrical current, the large current in the circuit loop would pass through the doorbell 10 to cause false action of the doorbell 10. Wherein, the small current indicates a current smaller than the driving current of the doorbell 10.

Figure 2:
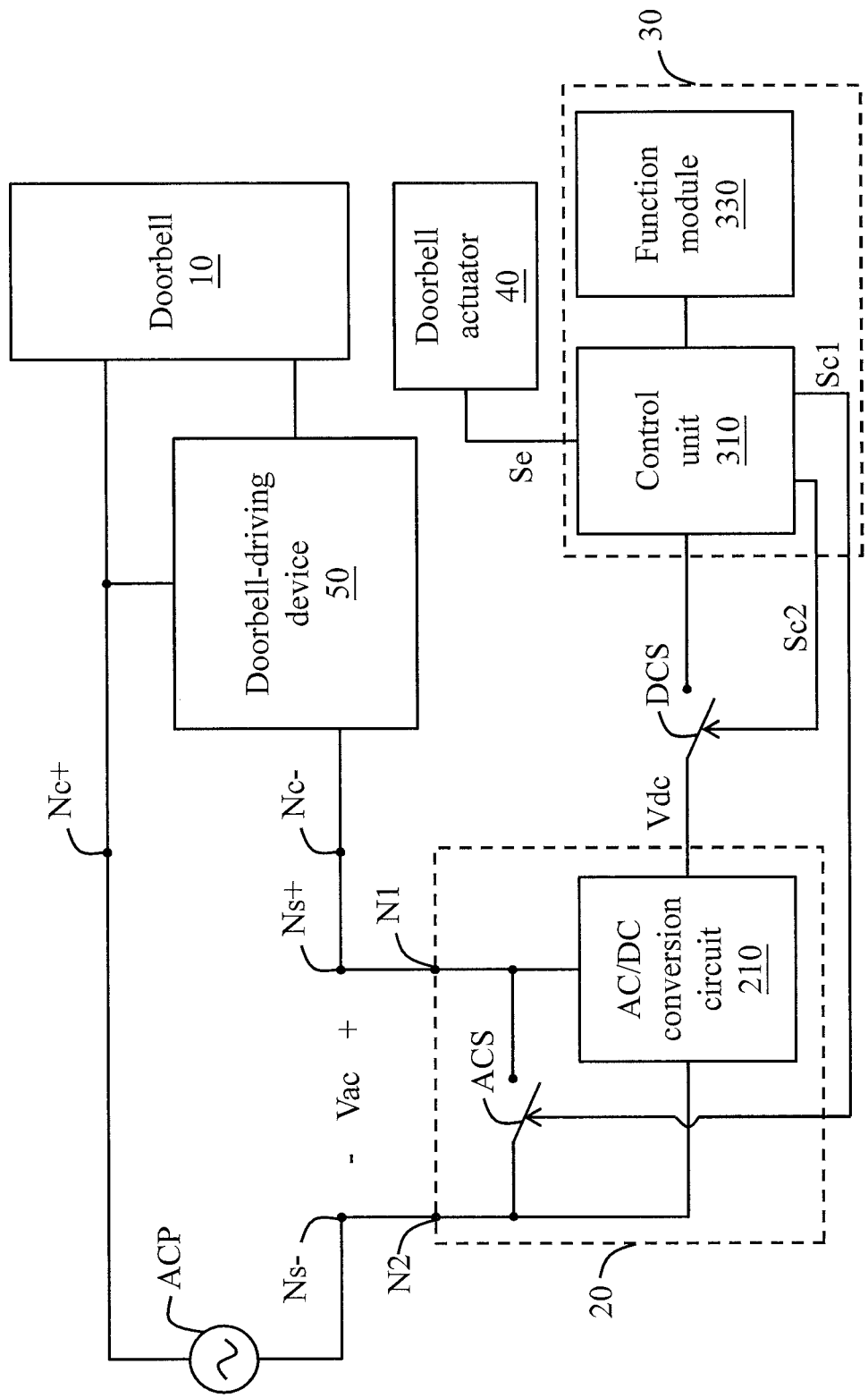
FIG. 2 illustrates a schematic view of an electronic system sharing power with doorbell of a second embodiment of the instant disclosure.
Figure 3:
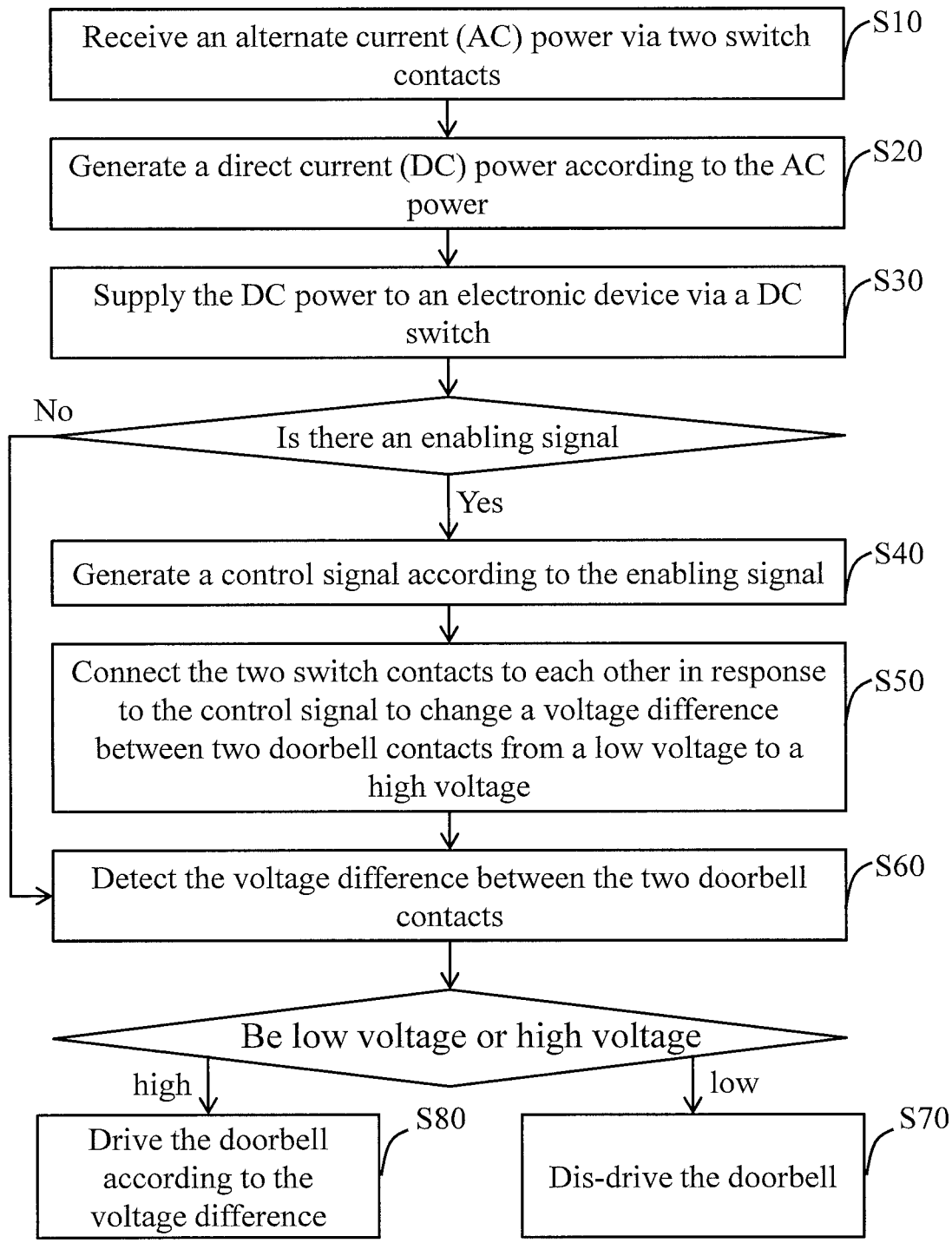
FIG. 3 is a flow diagram of a power-supply method for sharing power with doorbell of a first embodiment of the instant disclosure.

FIG. 2 illustrates a schematic view of an electronic system sharing power with doorbell of a second embodiment of the instant disclosure. FIG. 3 is a flow diagram of a power-supply method for sharing power with doorbell of an embodiment of the instant disclosure. Please refer to FIG. 2 and FIG. 3. In this embodiment, the electronic system includes a power-supply device 20, an electronic device 30, a doorbell actuator 40, a doorbell-driving device 50, and a DC switch DCS. The doorbell-driving device 50 is coupled to doorbell contacts Nc+, Nc− and a doorbell 10. The power-supply device 20 includes two power contacts N1, N2, an AC switch ACS, and an AC/DC conversion circuit 210 (hereinafter, called first AC/DC conversion circuit 210). The electronic device 30 includes a control unit 310 and a function module 330. The power contacts N1, N2 are directly coupled to the switch contacts Ns+, Ns− reserved on the building, respectively.

The AC switch ACS is coupled between the two power contacts N1, N2, and a control end of the AC switch ACS is coupled to the control unit 310. Two input ends of the first AC/DC conversion circuit 210 are respectively coupled to the two power contacts N1, N2. In other words, the first AC/DC conversion circuit 210 and the AC switch ACS are connected to each other in parallel. The DC switch DCS is coupled between an output end of the first AC/DC conversion circuit 210 and the electronic device 30. A control end of the DC switch DCS is coupled to the control unit 310. The doorbell actuator 40 is coupled to the function module 330. Here, the control unit 310 is adapted to control the operation of the function module 330. The first AC/DC conversion circuit 210 supplies the power to the electronic device 30 via the DC switch DCS. In addition, the doorbell-driving device 50 can detect a voltage difference of the doorbell contacts Nc+, Nc− and supply the power to the doorbell 10 according to the detected voltage.

In one embodiment, in a normal state, the AC switch ACS is off and the DC switch DCS is on. In other words, the power contacts N1, N2 receive the AC power Vac supplied by the AC power source ACP via the switch contacts Ns+, Ns− (step S10). The first AC/DC conversion circuit 210 receives the AC power Vac via the power contacts N1, N2, converts the AC power Vac into a DC power Vdc (step S20), and supplies the DC power Vdc to the electronic device 30 (the control unit 310 and the function module 330) via the DC switch DCS (step S30). In this case, the doorbell-driving device 50 detects the voltage difference of the doorbell contacts Nc+, Nc− to be a low voltage (step S60) and does not supply the power to the doorbell 10 (i.e., the doorbell 10 does not make sounds) (step S70). In other words, when the voltage difference of the doorbell contacts Nc+, Nc− is detected to be the low voltage, the doorbell-driving device 50 dis-drives the doorbell 10.

When the doorbell actuator 40 is enabled (e.g., when the doorbell actuator 40 is pressed, touched, or inputted with certain passwords or when the doorbell actuator 40 recognizes physiological features), the doorbell actuator 40 generates an enabling signal Se to the control unit 310. The control unit 310 generates a control signal Sc1 according to the enabling signal Se (step S40) and controls the AC switch ACS to be on with the control signal Sc1 (step S50). Hence, the AC switch ACS and the DC switch DCS are both on. In this case, the doorbell-driving device 50 detects the voltage difference of the doorbell contacts Nc+, Nc− to be a high voltage (step S60), and supplies the power to the doorbell 10 (i.e., the doorbell 10 makes sounds) according to the AC power Vac (step S80). In other words, when the voltage difference of the doorbell contacts Nc+, Nc− is detected to be the high voltage, the doorbell-driving device 50 drives the doorbell 10 according to the voltage difference of the doorbell contacts Nc+, Nc−.

After the doorbell 10 has been making sounds for a predetermined time, the control unit 310 generates the control signal Sc1 and a control signal Sc2, controls the AC switch ACS to be off with the control signal Sc1, and controls the DC switch DCS to be off with the control signal Sc2. In other words, after the AC switch ACS has been on for the predetermined time, the control unit 310 controls the AC switch ACS and the DC switch DCS both to be off, so that the doorbell 10 stops making sounds. Hence, the doorbell-driving device 50 detects the voltage difference of the doorbell contacts Nc+, Nc− to be zero to disable the doorbell-driving device 50. Next, the control unit 310 generates the control signal Sc2 and controls the DC switch DCS to be on with the control signal Sc2. Hence, the voltage difference of the doorbell contacts Nc+, Nc− is recovered to be the low voltage to enable the doorbell-driving device 50 again. When the doorbell-driving device 50 is enabled again, the doorbell-driving device 50 is reset as a normal state in which the doorbell-driving device 50 does not supply the power to the doorbell 10.

Here, the low voltage means the residual voltage, which is greater than zero, of the AC power Vac after being consumed by the electronic system (i.e., the power-supply device 20, the electronic device 30, the doorbell actuator 40, the doorbell-driving device 50, and the DC switch DCS). The high voltage means the AC power Vac.

In some embodiments, the control unit 310 can, by timing the on-time of the AC switch ACS (which is substantially equal to the ringing time of the doorbell 10) or by the control of a control switch, determine the generation of the control signal Sc1 for switching the AC switch ACS to be off and the control signal Sc2 for switching the DC switch DCS to be off.

Figure 4:
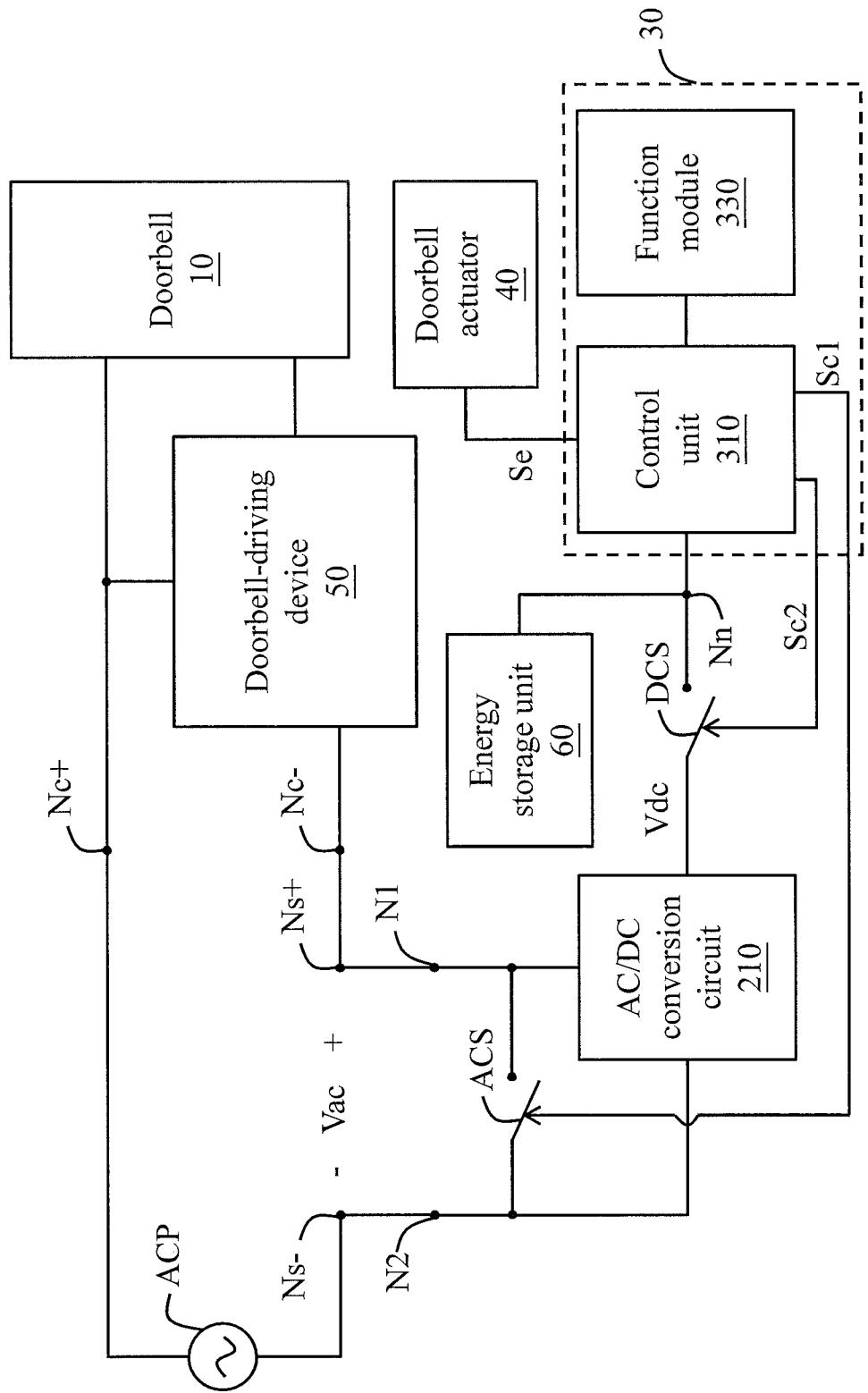
FIG. 4 illustrates a schematic view of an electronic system sharing power with doorbell of a third embodiment of the instant disclosure.

FIG. 4 illustrates a schematic view of an electronic system sharing power with doorbell of a third embodiment of the instant disclosure. Please refer to FIG. 4. In some embodiments, the electronic system may further include an energy storage unit 60, and the energy storing unit 60 is coupled to a node Nn between the DC switch DCS and the electronic device 30. Here, the energy storage unit 60 can supply the DC power to the backend circuit (i.e., electronic device 30) stably. When the DC switch DCS is on, the energy storage unit 60 can be charged according to the DC power Vdc outputted by the first AC/DC conversion circuit 210. When the AC switch ACS is off or when the DC power Vdc outputted by the first AC/DC conversion circuit 210 is too low, the energy storage unit 60 discharges to supply power for operating the electronic device 30. Wherein, the energy storage unit 60 may be a battery, a capacitor, or the like.

Figure 5:
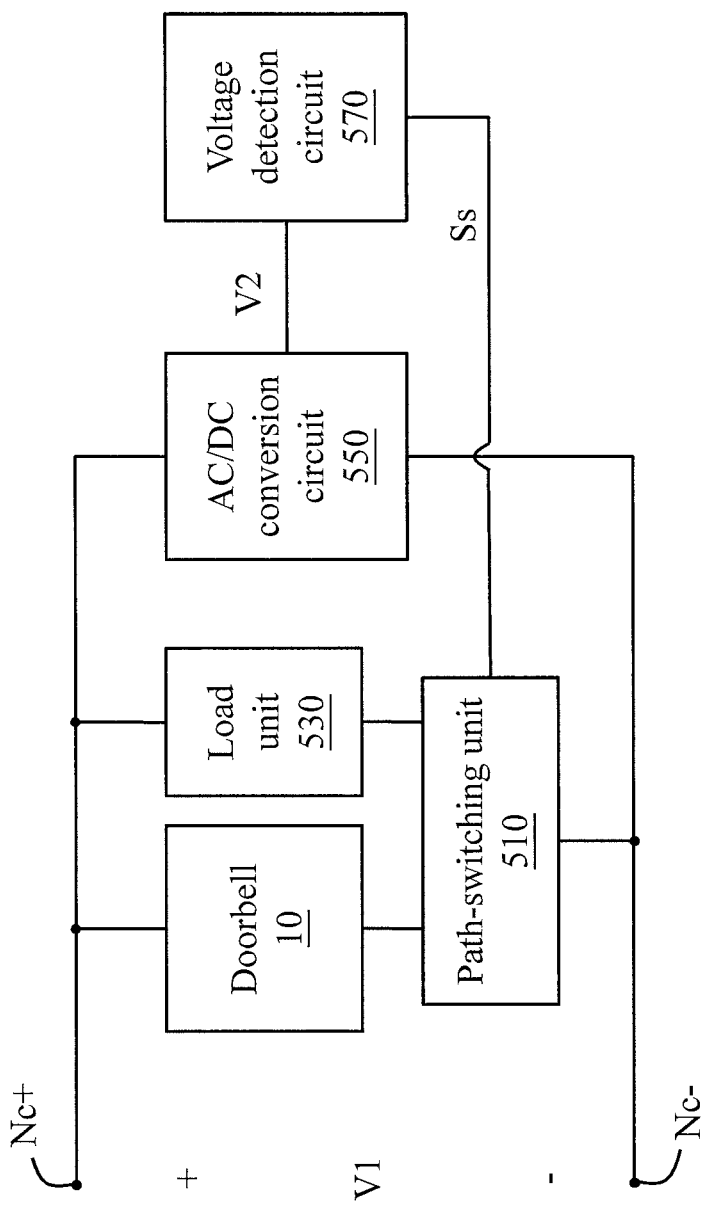
FIG. 5 illustrates a functional block diagram of one embodiment of the doorbell-driving device shown in FIG. 2 or FIG. 4.

FIG. 5 illustrates a functional block diagram of one embodiment of the doorbell-driving device 50 shown in FIG. 2 or FIG. 4. Please refer to FIGS. 2 and 5 or FIGS. 4 and 5. In some embodiments, the doorbell-driving device 50 includes a path-switching unit 510, a load unit 530, an AC/DC conversion circuit 550 (hereinafter, called second AC/DC conversion circuit 550), and a voltage detection circuit 570.

A first end of the path-switching unit 510 is coupled to the doorbell contact Nc−. The doorbell 10 is coupled between a second end of the path-switching unit 510 and the doorbell contact Nc+, and the load unit 530 is coupled between a third end of the path-switching unit 510 and the doorbell contact Nc+. A control end of the path-switching unit 510 is coupled to the voltage detection circuit 570. Input ends of the second AC/DC conversion circuit 550 are coupled to the doorbell contacts Nc+, Nc−, and an output end of the second AC/DC conversion circuit 550 is coupled to the voltage detection circuit 570.

The second AC/DC conversion circuit 550 receives the voltage difference V1 between the doorbell contacts Nc+, Nc− and converts the voltage difference V1 into a DC voltage V2. The voltage detection circuit 570 receives the DC voltage V2 and confirms the value of the DC voltage V2.

In a normal state, the AC switch ACS is off and the DC switch DCS is on, the first end of the path-switching unit 510 is connected to the load unit 530 but is dis-connected to the doorbell 10. Hence, the voltage detection circuit 570 confirms the value of the DC voltage V2 to be a low voltage (therefore, the voltage detection circuit 570 does not generate a switch signal Ss).

When the doorbell actuator 40 is enabled (e.g., when the doorbell actuator 40 is pressed, touched, or inputted with certain passwords or when the doorbell actuator 40 recognizes physiological features), the AC switch ACS and the DC switch DCS are both off. Hence, the voltage detection circuit 570 confirms the value of the DC voltage V2 to be a high voltage. Therefore, the voltage detection circuit 570 generates and outputs the switch signal Ss to the path-switching unit 510. The path-switching unit 510 receives the switch signal Ss and connects the first end of the path-switching unit 510 to the doorbell 10 (i.e., the first end of the path-switching unit 510 is not connected to the load unit 530) to supply the voltage difference V1 to the doorbell 10. In other words, the AC power source ACP supplies power to the doorbell 10 via the switch contacts Ns+, Ns− and the doorbell contacts Nc+, Nc− to drive the doorbell 10 to ring.

In order to stop the ringing of the doorbell 10, the control unit 310 controls the AC switch ACS and the DC switch DCS are off. Hence, the voltage detection circuit 570 confirms the value of the DC voltage V2 to be zero, so that the voltage detection circuit 570 is disabled. Next, the control unit 310 generates the control signal Sc2 again and controls the DC switch DCS to be off by the control signal Sc2. Hence, the voltage of the doorbell contacts Nc+, Nc− is recovered to be the low voltage, so that the voltage detection circuit 570 is enabled again. When the voltage detection circuit 570 is enabled again, the voltage detection circuit 570 resets the path-switching unit 510 back to the normal state; that is, the first end of the path-switching unit 510 is connected to the load unit 530, and the AC power source ACP does not supply power to the doorbell 10 (i.e., the doorbell 10 does not make sounds).

In some embodiments, the voltage detection circuit 570 may confirm the value of the voltage (or the value of the DC voltage V2) by one or more comparators. In some embodiments, the load unit 530 may be a dummy load, e.g., an impedance element.

Figure 6:
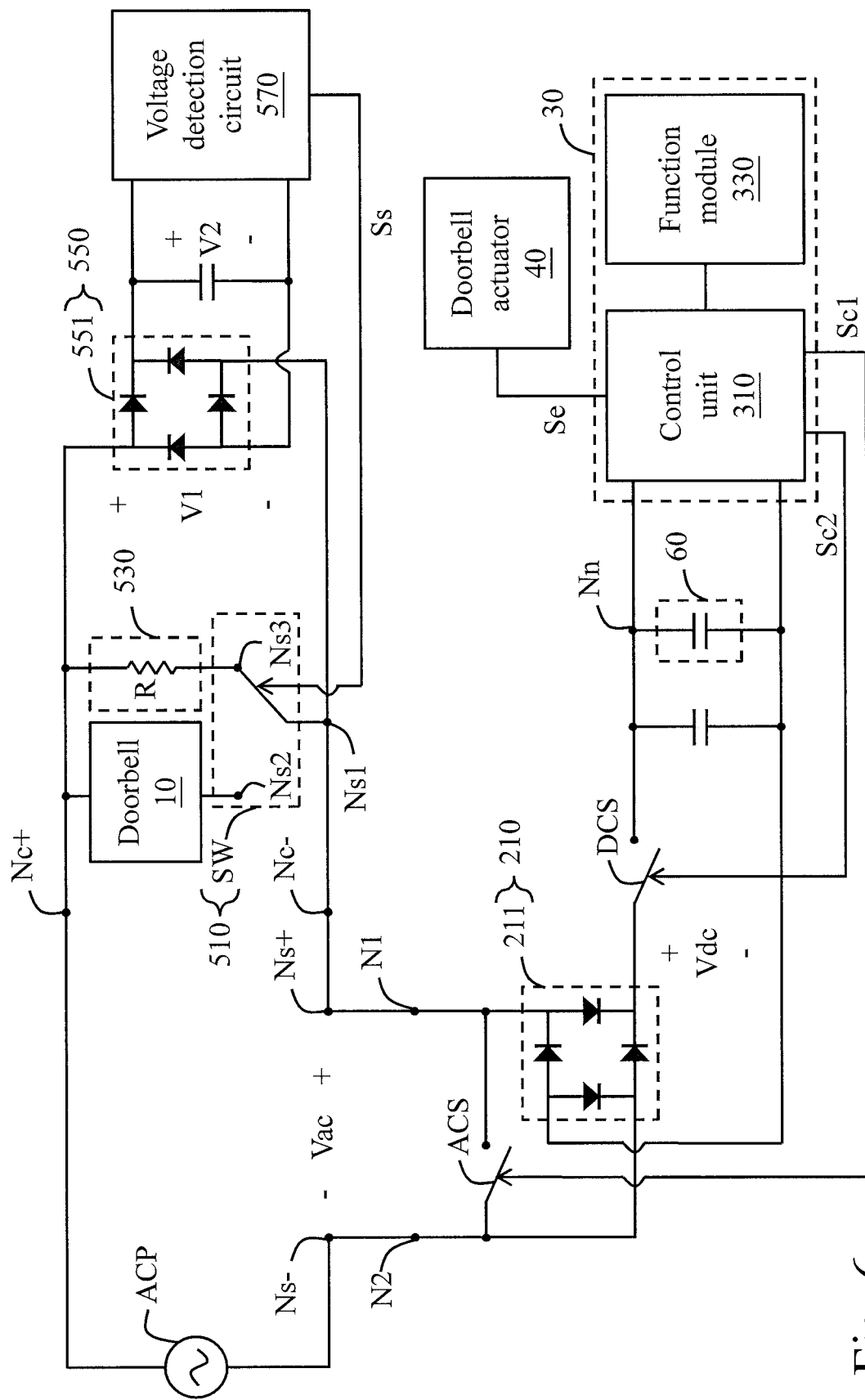
FIG. 6 illustrates a schematic view of an electronic system sharing power with doorbell of a fourth embodiment of the instant disclosure.

FIG. 6 illustrates a schematic view of an electronic system sharing power with doorbell of a fourth embodiment of the instant disclosure. Please refer to FIG. 6, in some embodiments, the first AC/DC conversion circuit 210 includes a rectifying unit 211 formed by a plurality of transistors. The rectifying unit 211 and the AC switch ACS are connected in parallel between the power contacts N1, N2. In other words, a first end of the rectifying unit 211 and one of two ends of the AC switch ACS are coupled to the power contact N1, and a second end of the rectifying unit 211 and the other end of the AC switch ACS are coupled to the power contact N2. A third end of the rectifying unit 211 is coupled to one of two ends of the DC switch DCS, and the other end of the DC switch DCS is coupled to one of two ends of the energy storage unit 60 and the electronic device 30 (a positive voltage end of the control unit 310). A fourth end of the rectifying unit 211 is coupled to the other end of the energy storage unit 60 and the electronic device 30 (a negative voltage end of the control unit 310). Hence, the rectifying unit 211 receives the AC power Vac and converts the AC power Vac into the DC power Vdc. When the DC switch DCS is on, the DC power Vdc is supplied to the energy storage unit 60 and the electronic device 30.

The path-switching unit 510 includes a switch unit SW, and the load unit 530 includes a resistance R. A first end Ns1 of the switch unit SW is coupled to the doorbell contact Nc−. A second end Ns2 of the switch unit SW is coupled to one of two ends of the doorbell 10. A third end Ns3 of the switch unit SW is coupled to one end of the resistance R. The other end of the doorbell 10 and the other end of the resistance R are coupled to the doorbell contact Nc+. The second AC/DC conversion circuit 510 includes a rectifying unit 551 formed by a plurality of transistors. A first end of the rectifying unit 551 is coupled to the doorbell contact Nc−, and a second end of the rectifying unit 551 is coupled to the doorbell contact Nc+. A third end of the rectifying unit 551 is coupled to a positive detection end of the voltage detection circuit 570. A fourth end of the rectifying unit 551 is coupled to a negative detection end of the voltage detection circuit 570. A control output end of the voltage detection circuit 570 is coupled to a control end of the switch unit SW. Hence, the rectifying unit 551 receives the voltage difference V1 between the doorbell contacts Nc+, Nc− and converts the voltage difference V1 into the DC voltage V2. The voltage detection circuit 570 detects the value of the DC voltage V2 to control the switching of the switch unit SW.

Here, the figures illustrates that the rectifying units are full-wave rectifiers, but embodiments are not limited thereto. In practice, the rectifying units may be half-wave rectifiers (not shown). In one another embodiment, some of the rectifying units are full-wave rectifiers, and the rest are half-wave rectifiers.

In some embodiments, the AC switch ACS may be a tri-electrode AC switch (TRIAC).

In some embodiments, the function module 330 may be a monitor, a wireless module, an indicator, a sensor, an IR-cut filter removable (ICR) switch, a storage unit, a display, a microphone module, a speaker, a door lock, an interphone, a caller, a driving circuit of a fire equipment, or any combinations thereof. The indicator may be a light-emitting diode (LED). The sensor may be a light sensor, an image sensor, an infrared sensor, a touch sensor, or the like. The storage unit may be a safety digital card (SD card), a memory, or other auxiliary storage devices (e.g., a combination of a disk and an optical disk drive, a disk drive, or the like). The memory may be a random access memory (RAM), a read-only memory (ROM), a cache memory, or the like.

In some embodiments, the doorbell actuator 40 may be a physical switch button, a virtual switch button, a feature recognizer, a magnet card sensor, a password inputter, or the like. Wherein, the feature recognizer may be a fingerprint recognizer, a pupil recognizer, a voiceprint recognizer, a face recognizer, or the like. The virtual switch button may be a button shown on the display when the control unit 310 executes software or firmware.

In some embodiments, the doorbell 10 may be a typical doorbell, a musical doorbell, an electronic doorbell, or the like.

Based on the above, the electronic system sharing power with doorbell and the power-supply method thereof in accordance with the foregoing embodiments can utilize the power of the doorbell to power other electronic devices without affecting the operation of the doorbell. In addition, the electronic system sharing power with doorbell and the power-supply method thereof in accordance with the foregoing embodiments can be installed in the existing switch installation box hole and the existing doorbell installation box hole on the building in a convenient and simple manner without assembling additional wires on the building.

What is claimed is:

1. An electronic system sharing power with doorbell, comprising:
    two power contacts, adapted to be coupled to two switch contacts, respectively;
    an alternate current (AC) switch, coupled between the two power contacts, wherein the AC switch is normal off;
    a first alternate current/direct current (AC/DC) conversion circuit, connected in parallel between the two power contacts together with the AC switch, and configured to receive an AC power via the two power contacts and generate a DC power according to the AC power;
    a DC switch, one end of the DC switch coupled to the first AC/DC conversion circuit, wherein the DC switch is configured to receive the DC power and the DC switch is normally on;
    an electronic device, coupled to another end of the DC switch, control end of the AC switch, and control end of the DC switch, and configured to provide a functional operation and to control the AC switch to be on according to an enabling signal, wherein the electronic device is powered with the DC power; and
    a doorbell-driving device, adapted to couple to two doorbell contacts and couple to a doorbell, and configured to detect a voltage difference of the two doorbell contacts and to supply power to the doorbell according to the detected voltage, wherein one of the two doorbell contacts is coupled to one of the two switch contacts.

2. The electronic system sharing power with doorbell according to claim 1, wherein when the AC switch is off and the DC switch is on, the voltage difference of the doorbell contacts is a low voltage and the doorbell-driving device does not supply power to the doorbell; and wherein when the AC switch is on and the DC switch is on, the voltage difference of the doorbell contacts is a high voltage and the doorbell-driving device supplies power to the doorbell.

3. The electronic system sharing power with doorbell according to claim 2, wherein when the AC switch has been on for a predetermined time, the electronic device controls the AC switch to be off and controls the DC switch to be off, to cause the voltage difference of the two doorbell contacts to be zero so as to disable the doorbell-driving device, and wherein when the doorbell-driving device is restarted, the doorbell-driving device is reset to be a normal state.

4. The electronic system sharing power with doorbell according to claim 1, wherein the doorbell-driving device comprises:

a load unit, one end of the load unit coupled to one of the two doorbell contacts;

a path-switching unit, coupled to another end of the load unit, the other of the two doorbell contacts, and the doorbell, and configured to connect the other doorbell contact to the load unit or the doorbell, wherein the patch switching unit normally connects the other doorbell contact to the load unit;

a second AC/DC conversion circuit, adapted to be coupled between the two doorbell contacts, and configured to receive the voltage difference between the two doorbell contacts and generate a DC voltage according to the voltage difference; and a voltage detection circuit, coupled to the second AC/DC conversion circuit, and configured to receive the DC voltage and control the switching of the path-switching unit according to the value of the DC voltage.

5. The electronic system sharing power with doorbell according to claim 4, wherein when the AC switch is off and the DC switch is on, the voltage difference is a low voltage and the path-switching unit connects the other doorbell contact to the load unit, such that the doorbell-driving device does not supply power to the doorbell; and wherein when the AC switch is on and the DC switch is on, the voltage difference is a high voltage and the voltage detection circuit controls the path-switching unit to connect the other doorbell contact to the doorbell, such that the doorbell-driving device supplies power to the doorbell.

6. The electronic system sharing power with doorbell according to claim 5, wherein when the AC switch has been on for a predetermined time, the electronic device controls the AC switch and the DC switch to be off, to cause the voltage difference to be zero so as to disable the voltage detection circuit, and wherein when the voltage detection circuit is restarted, the voltage detection circuit resets the path-switching unit to be a normal state.

7. The electronic system sharing power with doorbell according to claim 1, further comprising:

an energy storage unit, coupled to a node between the DC switch and the electronic device.

8. The electronic system sharing power with doorbell according to claim 7, wherein when the AC switch and the DC switch are off, the energy storage unit discharges power to supply power to the electronic device.

9. The electronic system sharing power with doorbell according to claim 1, further comprising:

a doorbell actuator, coupled to the electronic device, and configured to generate the enabling signal.

10. A power-supply method for sharing power with doorbell, comprising:

receiving an alternate current (AC) power via two switch contacts;

generating a direct current (DC) power according to the AC power;

supplying the DC power to an electronic device via a DC switch;

generating a control signal according to an enabling signal generated by a doorbell actuator;

connecting the two switch contacts to each other in response to the control signal to change a voltage difference between two doorbell contacts from a low voltage to a high voltage;

detecting the voltage difference between the two doorbell contacts; and driving the doorbell according to the voltage difference when the voltage difference is detected to be the high voltage;

wherein the AC power is not supplied to the doorbell when the voltage difference is detected to be the low voltage.

11. The power-supply method for sharing power with doorbell according to claim 10, further comprising:

charging an energy storage unit according to the DC power; and when the DC switch is off, supplying power to the electronic device by the energy storage unit.

12. The power-supply method for sharing power with doorbell according to claim 10, further comprising:

when the two switch contacts have been connected to each other for a predetermined time, switching the two switch contacts to be off and switching the DC switch to be off, to cause the voltage difference to be zero; and after the voltage difference is caused to be zero, switching the DC switch to be on to change the voltage difference from zero to the low voltage.

13. The power-supply method for sharing power with doorbell according to claim 10, further comprising:

connecting one of the two doorbell contacts to one end of a load unit or the doorbell by a path-switching unit, wherein the other of the two doorbell contacts is coupled to another end of the load unit, and the one doorbell contact is normally connected to the one end of the load unit; and controlling the switching of the path-switching unit according to a DC voltage;

wherein the detecting step comprises receiving the voltage difference between the two doorbell contacts and generating the DC voltage according to the voltage difference.

14. The power-supply method for sharing power with doorbell according to claim 13, wherein when the two switch contacts are not connected to each other and the DC switch is on, the path-switching unit connects the one doorbell contact to the load unit in the connecting step of the one doorbell contact, and when the two switch contacts are connected to each other and the DC switch is on, the path-switching unit connects the one doorbell contact to the doorbell in the connecting step of the one doorbell contact, to perform the driving step.

15. The power-supply method for sharing power with doorbell according to claim 14, further comprising:

when the two switch contacts have been connected to each other for a predetermined time, switching the two switch contacts to be off and switching the DC switch to be off, to cause the voltage difference to be zero so as to disable the detection step; and after the detection step is disabled, switching the DC switch to be on to change the voltage difference from zero to the low voltage so as to restart the detection step.

* * * * *